(12) United States Patent
Moser et al.

(10) Patent No.: US 7,093,237 B2
(45) Date of Patent: Aug. 15, 2006

(54) HIGH PERFORMANCE DEBUGGING IN A MESSAGE FLOW ENVIRONMENT

(75) Inventors: Simon Daniel Moser, Tornonto (CA); William G. O'Farrell, Markham (CA); Shuxia Tan, Tornonto (CA)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/121,739

(22) Filed: Apr. 11, 2002

(65) Prior Publication Data
US 2002/0188930 A1    Dec. 12, 2002

(30) Foreign Application Priority Data
Apr. 27, 2001 (CA) .................................. 2345416

(51) Int. Cl.
*G06F 9/44* (2006.01)
(52) U.S. Cl. ...................................... 717/129; 717/127
(58) Field of Classification Search ........ 717/168–178, 717/127, 129
See application file for complete search history.

(56) References Cited

U.S. PATENT DOCUMENTS

| | | | | |
|---|---|---|---|---|
| 6,353,923 B1 * | 3/2002 | Bogle et al. ................. | 717/128 |
| 6,412,106 B1 * | 6/2002 | Leask et al. ................. | 717/124 |
| 6,553,565 B1 * | 4/2003 | Click et al. .................. | 717/129 |
| 2003/0005415 A1 * | 1/2003 | Bates et al. ................. | 717/129 |
| 2004/0168155 A1 * | 8/2004 | O'Farrell et al. ........... | 717/129 |
| 2004/0268185 A1 * | 12/2004 | Tan et al. ..................... | 714/38 |

* cited by examiner

*Primary Examiner*—Wei Zhen
(74) *Attorney, Agent, or Firm*—Stehpen J. Walder, Jr.; Jeffrey S. LaBaw

(57) ABSTRACT

A message flow environment permits a developer to define a debug session in which nodes in a defined message flow have a debug function. A debug controller is used to select nodes as breakpoints using data in shared memory accessible to the nodes in the defined message flow. Each node having a debug function will determine whether it is a breakpoint by accessing the shared memory. Where a node determines that it is a breakpoint, the node will communicate debug information to the debug controller. An independent daemon runs to permit a developer to define breakpoints from the set of debug nodes. The nodes having a debug function maintain a stack in the shared memory which is sent to the debug controller by each breakpoint node when reached by a message.

14 Claims, 2 Drawing Sheets

HIGH PERFORMANCE DEBUGGING IN A MESSAGE FLOW ENVIRONMENT

FIELD OF THE INVENTION

The present invention is directed to an improvement in computing systems and in particular to high performance debugging in a message flow environment.

BACKGROUND OF THE INVENTION

In complex computer systems communication is often desirable between disparate applications. One approach to such communication is to implement a system architecture for programming and executing message flows. Such message flows transfer messages between different components in the computer system (either within a single computer or distributed over more than one computer). For example, message flows may be used to carry out database transactions in a distributed computing environment.

An example of a commercially available message flow architecture is the MQ Series Integrator developed by IBM Corporation (MQSI). This architecture supports a visual programming interface to permit developers to define message flows.

In a message flow architecture such as MQSI, a message flow is defined using nodes that represent message input, computation, database access, filtering, and output of messages. Message flows are represented as nodes connected in a manner defined by the developer. The defined message flows may be nested and have many other features found in conventional computer programs. Message flow environments typically provide development tools used by developers to define the message flows which run separately from the executable message flows themselves.

In defining a message flow a developer may inadvertently introduce errors or bugs that are not discovered until the defined message flow is tested. Message flow development environments may provide a debugging facility to assist the developer in uncovering bugs in the message flow design.

To facilitate debugging of a target message flow, message flow development environments such as MQSI permit the developer to specify a debug session. One way of providing for a debug session is to insert debug nodes between each node in the target message flow. The message flow developer is then able to specify certain of the debug nodes to be breakpoints. In this approach, the message flow architecture includes a debug controller component (perhaps part of the development component) and the debug nodes are implemented as plugins. Because the defined message flow executes separately from the development components such as a debug controller, there must be a communication channel established between the debug controller and the message flow being debugged.

One mechanism for such communication is to define the debug node plugins such that when a message reaches each plugin debug node, the node will use the communication channel to communicate with the debug controller. The debug controller then determines whether the developer has defined the plugin node to be a breakpoint. If the plugin debug node is defined to be a breakpoint, data is displayed to the developer to assist in debugging the message flow.

The communication between the debug plugin node and the debug controller typically occurs using a distributed computing communication mechanism such as TCP/IP sockets, Asynchronous Transfer Mode protocol, System Network Architecture, Novell Netware or Banyan Vines, depending on the machine platform used by the message flow environment. This type of communication between the executable message flow and the debug controller component introduces a potentially significant overhead into the debugging process as sockets and similar mechanisms may be relatively slow and each debug plugin node is required to use the mechanism to communicate with the debug controller.

With such an approach, debugging for small numbers of messages through a defined message flow may be feasible. However, for certain types of defined message flows it is desirable or necessary to permit a high volume of messages to be processed by the defined message flow to determine the source of a detected error. In such a case the overhead required in communicating between debug plugin nodes and the debug controller potentially slows the operation of the defined message flow to such a degree that the usefulness of the debugging operation is affected.

It is therefore desirable to have a debugging facility for a message flow environment which permits high volumes of messages to be processed while debugging facilities are in place in a message flow, without significant detrimental overhead cost.

SUMMARY OF THE INVENTION

According to one aspect of the present invention, there is provided an improved message flow environment debugger.

According to another aspect of the present invention, there is provided a method for providing a debug information to a developer in a message flow environment, the message flow environment including a debug controller and including defined message flows having nodes, the method including the steps of allocating shared memory accessible by all nodes in a defined message flow, altering the definition of the message flow to provide nodes to function as debug nodes, using the allocated shared memory to define specified nodes to be breakpoints for the defined message flow, upon a message reaching a one of the nodes functioning as a debug node in the defined message flow, checking the shared memory to determine if the node is defined to be a breakpoint, and if the node is defined as a breakpoint, providing for the node to communicate debug information to the debug controller for display to the developer.

According to another aspect of the present invention, there is provided the above method in which the step of altering the definition of the message flow includes the step of inserting debug node plugins in the message flow.

According to another aspect of the present invention, there is provided the above method further including the steps of maintaining a runtime stack in a portion of the allocated shared memory, the maintenance of the stack including the steps of providing a unique identifier for each defined message flow, each node functioning as a debug node carrying out one of a set of stack operations on the runtime stack based on the message flow identifier of the defined message flow containing the node and the state of the stack, the set of stack operations including no action, where the top item on the stack is equal to the message flow identifier of the defined message flow containing the node, a push of the message flow identifier of the defined message flow containing the node, where the stack is empty, or the only items in the top two stack elements are not equal to the message flow identifier of the defined message flow containing the node, and a pop where the second item on the stack is equal to the message flow identifier of the defined message flow containing the node.

According to another aspect of the present invention, there is provided the above method in which the step of the node communicating debug information to the debug controller further includes the step of the breakpoint node communicating the runtime stack state to the debug controller.

According to another aspect of the present invention, there is provided the above method further including the steps of defining a pool of shared memory at an initialization stage in the message flow environment, and providing each node functioning as a debug node in each defined message flow with a message flow identifier, the step of allocating shared memory accessible by all nodes in a defined message flow including a first debug node in a message acquiring a subset of the pool of shared memory and associating that subset of memory with the message flow identifier, whereby other nodes with matching message flow identifiers access the subset of memory.

According to another aspect of the present invention, there is provided the above method further including the step of spawning a daemon thread to independently accept communication from the debug controller to update the shared memory to define breakpoints in the message flow.

According to another aspect of the present invention, there is provided a computer program product for providing a debug information to a developer in a message flow environment, the message flow environment including a debug controller and including defined message flows having nodes, the computer program product including a computer-readable data storage medium and means recorded on the medium for carrying out one or more of the above methods.

Advantages of the present invention include a high performance debugging facility in a message flow environment in which debug nodes may be added to a defined message flow without incurring an unacceptable overhead in the time need to process messages in the message flow.

BRIEF DESCRIPTION OF THE DRAWING

The preferred embodiment of the invention is shown in the drawings, wherein.

Figure 1:
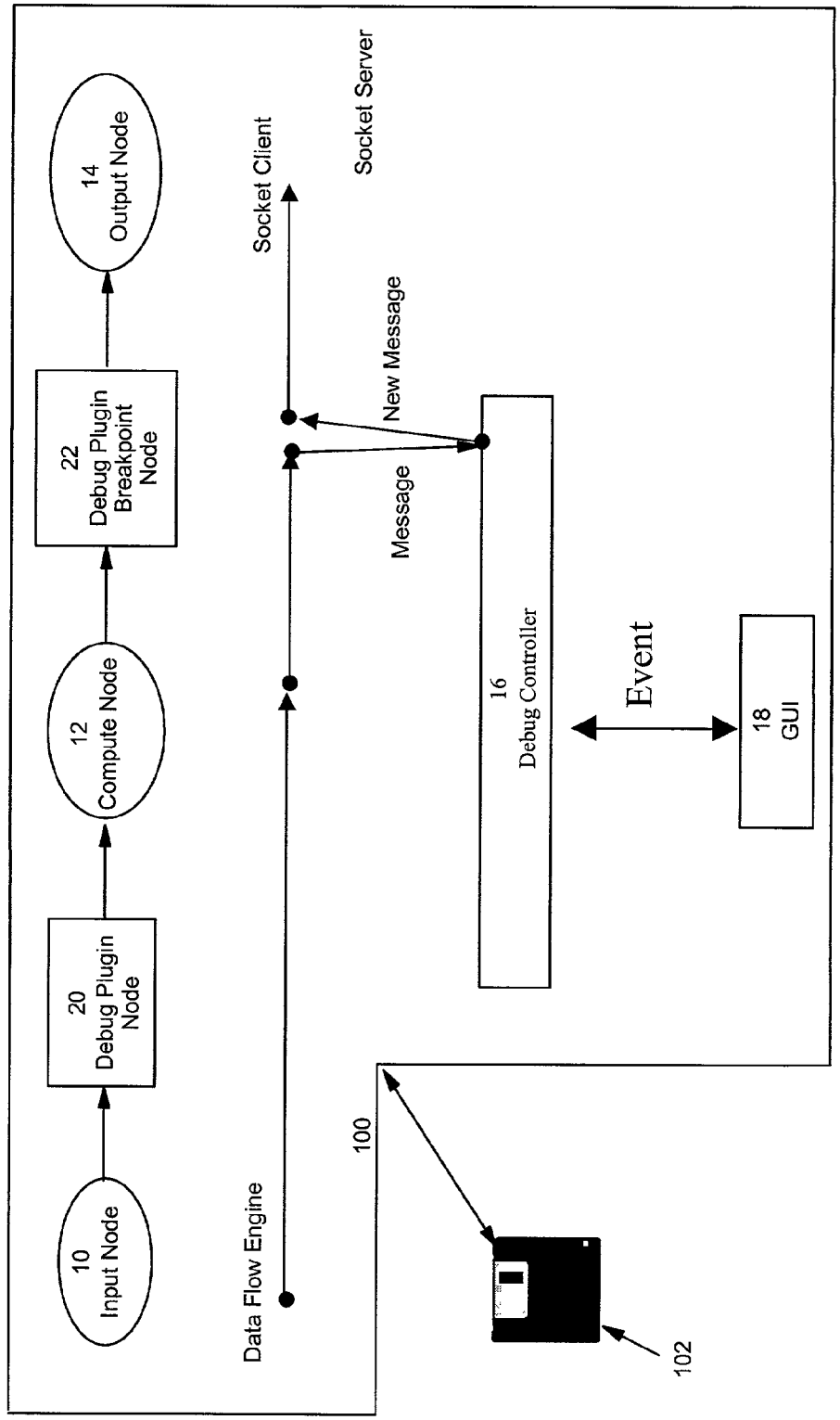
FIG. 1 is a schematic flow diagram illustrating the architecture of the preferred embodiment in an example message flow.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 is a schematic flow diagram illustration the architecture of the preferred embodiment in an example message flow within a distributed computer system 100. Various aspects of the present invention may include computer executable/readable instruction and data which may be stored on a computer readable medium 102. For example, aspects of the present invention may be implemented as a computer readable medium (e.g. hard disk drives, CD-roms, etc.) storing a computer program product stored in portions of system 100.

FIG. 1 shows a simple defined message flow having input node 10, compute node 12 and output node 14. These nodes are connected in series. FIG. 1 shows debug controller 16 having a graphical user interface GUI 18. The developer uses GUI 18 to pass events to debug controller 16, which are used to define and manage a debug session in the defined message flow represented by nodes 10, 12, 14. FIG. 1 shows debug nodes 20, 22 which are plugins inserted in the message flow defined by nodes 10, 12, 14.

In the debugging facilities provided previously, each of debug nodes 20, 22 would communicate directly with debug controller 16 when a message reached the debug node.

According to the preferred embodiment of the invention, however, debug plugin nodes communicate with debug controller 16 only when the plugin debug node is defined by the developer (using GUI 18) to be a breakpoint. Thus in the example of FIG. 1, debug plugin node 20 is not defined to be a breakpoint whereas debug plugin node 22 is defined as a breakpoint. The difference between the two debug plugin nodes can be seen in the representation of the data flow engine shown in FIG. 1. The data flow engine shows a message being passed to debug controller 16 and a new message being returned to debug plugin breakpoint node 22 on a message reaching debug plugin breakpoint node 22. It is for this operation that a socket is created to handle communication of data from debug plugin breakpoint node 22 to debug controller 16.

According to the preferred embodiment of the invention, when a developer specifies, through GUI 18, that a debug session is to be entered in the message flow environment, debug controller 16 generates plugin debug nodes to be inserted between the message flow nodes (and between call and return points to and from nested message flows) in the defined message flow. In the example of FIG. 1, the plugins of debug nodes 20, 22 are inserted. The developer may then use GUI 18 to define specified debug nodes in the message flow to be breakpoints. In the example of FIG. 1, plugin debug node 22 is such a defined point. In this description of the preferred embodiment, the debugging facility in the defined message flow is provided by the debug node plugins. An alternative implementation involves the inclusion of debugging features in the nodes of the message flow themselves. In such an implementation, the functionality of the debug node plugins is provided in the nodes of the message flow and the initiation of a debug session will potentially involve the debug controller communicating with the nodes of the message flow to turn on the debugging functions in the message flow nodes. In either implementation, a debug session will be commenced by debug functionality being introduced in the message flow (by inserting debug node plugins or by turning on the debug functionality in the existing nodes in the message flow).

In the implementation of the preferred embodiment, debug controller 16 writes data to a memory location accessible to each of the debug plugin nodes. This data specifies whether each debug node is a breakpoint, or not. When a debug node is reached by a message in the message flow, the plugin for the debug node will determine, by accessing the common memory location, whether the debug node is defined to be a breakpoint, or not. If the debug node is not defined to be a breakpoint, the plugin for the debug node (represented in the example of FIG. 1 by plugin debug node 20) passes the message to the downstream node (in FIG. 1, compute node 12). No message is passed from the plugin debug node to the debug controller. There is therefore no communication overhead for such a non-breakpoint debug node.

In the debug facility of the preferred embodiment, information is displayed to the developer which identifies the breakpoint that a message has arrived at and provides the status of the runtime stack. The runtime stack indicates which node is reached in the message flow and provides relative location of the node (the node call structure) within nested message flows. In the preferred embodiment, such information is displayed to a user by accessing runtime stack data. Previously, where each plugin debug node communicated with a debug controller, whether or not the debug node was specified to be a breakpoint, it was possible for the debug controller itself to maintain the runtime stack which could be displayed using the GUI at a defined breakpoint. In the preferred embodiment, however (where the plugin debug nodes communicate with the debug controller only when they are defined as breakpoints), this approach is not possible. In the preferred embodiment, the runtime stack is maintained by each plugin debug node using an accessible memory location associated with the message flow thread, as is described in more detail below.

In the preferred embodiment, plugin debug nodes 20, 22 contain code to access the shared memory to determine if the debug node is a breakpoint. Where the debug controller has stored data in the shared memory to indicate that the node is a breakpoint (node 22 in FIG. 1), a TCP/IP socket is created for communication with debug controller 16. This permits debugging data to be passed from plugin debug node 22 to debug controller 16 and the data is displayed to the developer using GUI 18.

In the preferred embodiment, a daemon (spawned at the time the message flow architecture—such as the MQSI execution group—is initialized) functions as an independent means of receiving breakpoint information from debug controller 16. The daemon thread establishes a socket connection with debug controller 16, in the preferred embodiment. Debug controller 16 will communicate with the daemon thread which listens for the communication. Debug controller 16 is therefore able to communicate with the daemon using the socket connection to specify to the thread the breakpoints that are being added or removed by the developer and the daemon thread will write the appropriate data to the shared memory. This permits the developer to set a breakpoint in a defined message flow at any time, using this daemon thread. Without the daemon thread, the developer would be required to wait for a breakpoint debug node to communicate with debug controller 16 before an alteration to the breakpoints could be carried out (as debug controller 16 does not typically have direct access to the shared memory needed to change the defined breakpoints).

As will be appreciated, the preferred embodiment provides that the cost to establish a socket connection between a debug plugin breakpoint node and debug controller 16 is incurred only where the node is defined as a breakpoint and where debug information will be displayed to the developer. This communication time is shorter than the time typically required for the developer to examine the presented debug data.

For non-breakpoint debug node plugins there is a slight cost only associated with a message being propagated through the node. Therefore the rate of message propagation in a defined message flow in a debug session will proceed at a near normal pace until a message passes through a breakpoint node. Thus where a high traffic route through a defined message flow has no breakpoints, high volumes of messages may be handled, without undesirable performance degradation. Breakpoints may be defined by developers in low traffic branches in the message flow. This will trigger a message to the developer only on those occasions when a message passes through this low traffic branch of the message flow.

Where each debug node plugin communicates with the controller whenever it receives a message, the controller can maintain a runtime stack (the "controller stack"). In such a case, the controller stack may be used to drive the stack display which is used to communicate information about the nesting of the defined message flows to developers. In this approach, on receipt of a communication from a debug node plugin associated with entry-to or exit-from a nested flow, requisite push and pop operations are performed by the debug controller on the controller stack. Unique identifiers for the message flows are placed on the stack. (in the preferred embodiment the unique identifiers are the UUIDs for the defined message flows) The stack therefore defines the nesting level of any reached node during message processing.

In the preferred embodiment, the communication to debug controller 16 at non-breakpoint debug nodes is eliminated. It is therefore not possible for debug controller 16 to maintain a controller stack. However, in the preferred embodiment information about message flow nesting is provided to the developer at breakpoints. To accomplish this, a runtime stack is maintained and is updated directly by each debug node plugin. The preferred embodiment provides a per-thread area made available for each message that arrives in the flow. This area is used for the run-time stack for each message.

In the preferred embodiment, every thread that processes a message through the defined message flow will update the stack every time the message passes through a debug node (by executing the plugin for that node). At breakpoints, the current state of the stack is transmitted to debug controller 16, where it is displayed to the developer using GUI 18. Because message flows can have multiply nested components, GUI 18 includes a stack display which allows the developer to see the current level of nesting (for the breakpoint), and to see the parent flows in detail by selecting the flow names shown in the stack display.

In the message flow environment of the preferred embodiment, message flows are not permitted to be recursive. This permits the preferred embodiment to employ stack management that is implemented using only the message flow UUID attribute (or alternatively, any other analogous unique identifier for a defined message flow). Each debug node contains code to obtain values for the top two items on the stack (if there are two) and to compare those values with the value of the reached node's message flow UUID attribute.

The actions taken by the debug node on the runtime stack are as follows:

If the flow UUID is not in either stack entries, then PUSH the current flow UUID;

If the flow UUID is on the top of the stack, then take no action;

If the flow UUID is second from the top of the stack, then POP the top entry on the stack;

The result of this stack management technique is that the runtime stack (in shared memory) is kept current so that it may be used to drive the GUI display for defined breakpoint debug nodes.

Table 1 illustrates all possible stack actions in this order: empty stack, stacks with exactly one element, and stacks with two or more elements. The message flow UUID of the debug node taking the action (the reached node) is assumed to be "x." The UUIDs on the stack may or may not include x, with "y" and "z" being used to represent distinct UUIDs not equal to x. Note that because nested message flows are not recursive, any given UUID cannot appear on the stack more than once.

TABLE 1

| TOP TWO ENTRIES IN STACK | ACTION |
|---|---|
| <empty> | Push |
| x | No action |
| y x | Push |
| y x | No action |
| y y x | Pop |
| y z | Push |

Figure 2:
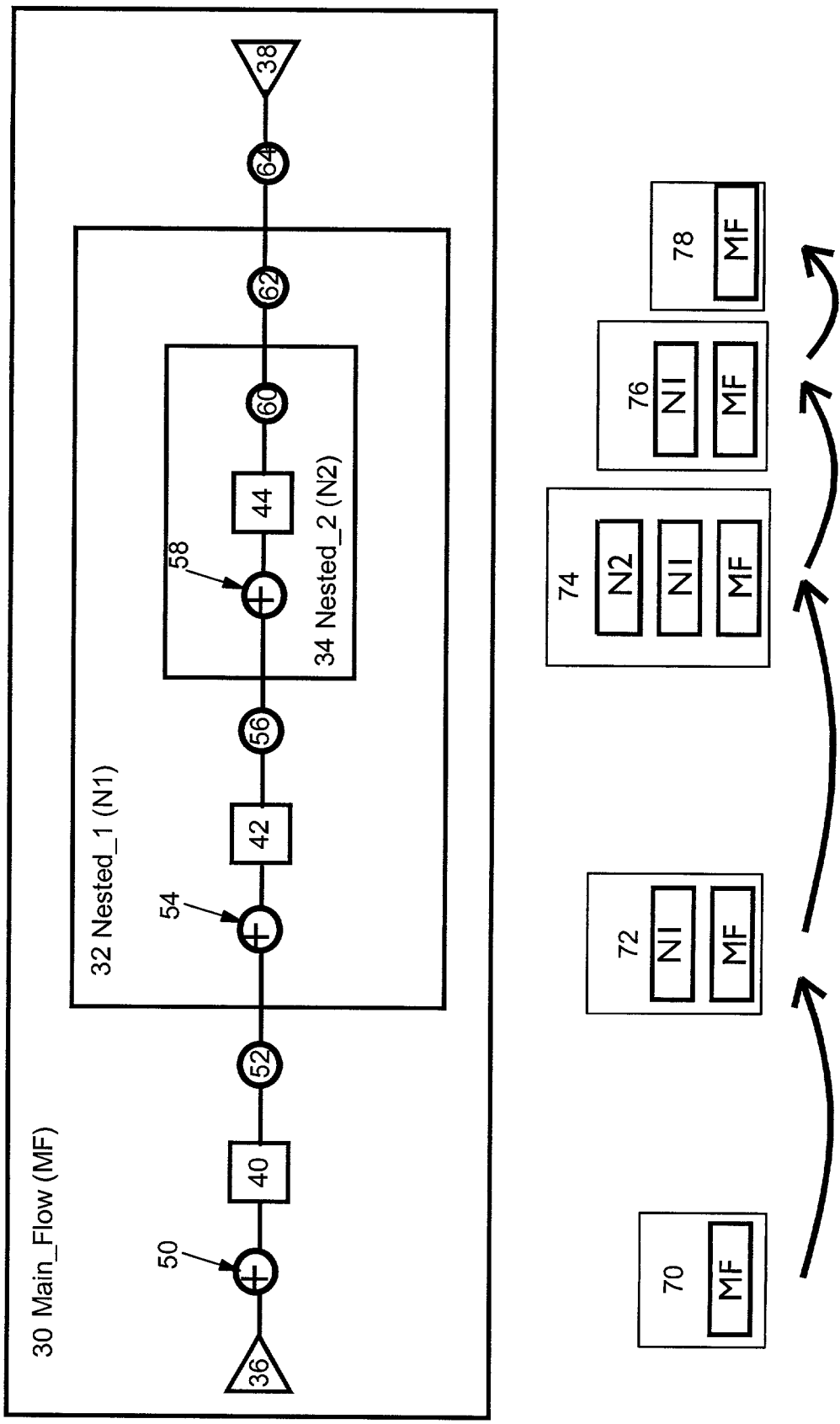
FIG. 2 is a schematic block diagram illustrating runtime stack maintenance according to the preferred embodiment.

FIG. 2 is a schematic representation of an example of message flow 30 having nested message flow 32 and further subnested message flow 34. Each defined message flow has a unique identifier. In the example of FIG. 2, the UUID for the message flows are represented by MF, N1 and N2: MF for message flow 30, N1 for message flow 32 and N2 for message flow 34. The full message flow is shown in FIG. 2 with input node 36 and output node 38. Example message flow nodes 40, 42 and 44 are shown in the different defined message flows 30, 32, 34. FIG. 2 also shows debug nodes 50, 52, 54, 56, 58, 60, 62, and 64 located between each of the message flow nodes and before and after each call and return to and from a nested message flow. FIG. 2 also shows a representation of the runtime stack at five different points in the defined message flow, represented by stack 70, 72, 74, 76, 78.

The stack operations carried out by debug nodes, 50, 52, 54, 56, 58, 60, 62, 64 are shown diagrammatically by a plus symbol within a node for a stack push of the message flow identifier (the UUID in the preferred embodiment), a minus symbol for a pop and no symbol for no operation. The state of the runtime stack can be traced using FIG. 2. At node 50, the stack is empty. Node 50 therefore performs a push operation. The identifier for message flow 30 (MF) is pushed on the stack, resulting in the runtime stack as shown in stack 70. Where, as is the case for nodes 52, 56 and 60, the top entry on the stack is the identifier of the message flow containing the node, no action is taken on the stack by the debug node. For debug nodes 54, 58 a push operation is carried out as the message flow identifier does not match the topmost entry on the stack (for node 54 the message flow identifier N1 does not match the top entry on stack 70; for node 58 message flow identifier N2 does not match the top entry on stack 72). Similarly, a pop operation is carried out where the message flow identifier is the second item from the top of the stack, as is the case for nodes 62 and 64.

As will be seen from the example of FIG. 2, the operations carried out above by the debug nodes in accordance with the preferred embodiment provide a current runtime stack, without the need for the debug controller 16 to maintain the stack based on communications received from the different debug nodes inserted in the debug session. In this way the stack data useful for debugging the message flow can be made available to the developer without requiring repetitive and expensive communication between debug node plugins and the debug controller. Rather, the runtime stack is maintained in accessible memory and updated by each debug node plugin in the defined message flow.

As is set out above, each debug node plugin accesses a shared memory location to determine if the node is defined as a breakpoint (a message flow's shared storage area will also contain a thread object for a daemon thread that will be responsible for receiving breakpoint data from debug controller 16). In the preferred embodiment, the shared memory is defined in the following manner. A pool of shared areas is initialized at the time that the message flow environment generates the object to permit the debug nodes to be created (in the preferred embodiment this is the debug node "lil" load time). This pool is accessible by all debug nodes in all execution groups within a single broker in the distributed system of the preferred embodiment.

To allocate shared memory within the pool, an attribute called "message flow id" is defined for each debug node. In the preferred embodiment, this message flow id consists of the message flow UUID, concatenated with the debug controller host id and process id. Each debug node in a defined message flow checks the pool of shared areas to determine if a shared area has been allocated for the given flow id. If a shared area has not been allocated for the given message flow id, then the debug node performs the allocation and stores in the pool a pointer to the newly allocated area, along with its message flow id value. If a shared area has been allocated, the debug node plugin checking the pool will discover the previously allocated area. Instead of allocating a new area, then, the debug node plugin will store within its private storage a pointer to the previously allocated area.

Every debug node within a message flow will have the same value set for its flow id attribute, therefore every such debug node will either create or discover a pointer to the same shared area, thus achieving the goal of a single shared area to store the common breakpoint information.

To ensure that race conditions are avoided in a multithread environment, appropriate serialization techniques are employed where shared memory is allocated and accessed. In the preferred embodiment, each shared area has an associated mutex to control multithreaded access to it. A mutex is also used to serialize access to the pool of shared areas.

As may be seen from the above, the message flow id is defined to reflect the message flow, the debug controller and the message execution thread. This permits multiple threads to use the same debug controller for the same message flow without causing uncertainty in the allocation of shared memory, as described above. This permits a single runtime (perhaps on a Unix server) to be shared by several debug controllers, each running on its own NT workstation, and alternatively permits several debug controllers to be running on the same host.

Although a preferred embodiment of the present invention has been described here in detail, it will be appreciated by those skilled in the art, that variations may be made thereto. Such variations may be made without departing from the spirit of the invention or the scope of the appended claims.

We claim:

1. A method for providing debug information to a developer in a message flow environment, the message flow environment comprising a debug controller and comprising defined message flows having nodes, the method comprising the steps of:

allocating shared memory accessible by all nodes in a defined message flow, altering the definition of the message flow to provide nodes to function as debug nodes, using the allocated shared memory to define specified nodes to be breakpoint nodes for the defined message flow, upon a message reaching a one of the nodes functioning as a debug node in the defined message flow, checking the shared memory to determine if the node is defined to be a breakpoint node, and if the node is defined as a breakpoint node, providing for the node to communicate debug information to the debug controller for display to the developer.

2. The method of claim 1 in which the step of altering the definition of the message flow comprises the step of inserting debug node plugins in the message flow.

3. The method of claim 1, further comprising maintaining a runtime stack in a portion of the allocated shared memory, the maintenance of the stack comprising:

providing a unique identifier for each defined message flow, each node functioning as a debug node carrying out one of a set of stack operations on the runtime stack based on the message flow identifier of the defined message flow containing the node and a state of the stack, the set of stack operations comprising:

no action, where a top item on the stack is equal to the message flow identifier of the defined message flow containing the node, a push of the message flow identifier of the defined message flow containing the node, where the stack is empty, or the only items in a top two stack elements are not equal to the message flow identifier of the defined message flow containing the node, and a pop where a second item on the stack is equal to the message flow identifier of the defined message flow containing the node.

4. The method of claim 3, in which the node communicating debug information to the debug controller further comprises the step of the breakpoint node communicating the runtime stack state to the debug controller.

5. The method of claim 1, further comprising the steps of:

defining a pool of shared memory at an initialization stage in the message flow environment, and providing each node functioning as a debug node in each defined message flow with a message flow identifier, the step of allocating shared memory accessible by all nodes in a defined message flow comprising a first debug node in a message acquiring a subset of the pool of shared memory and associating that subset of memory with the message flow identifier, whereby other nodes with matching message flow identifiers access the said subset of memory.

6. The method of claim 1, further comprising the step of spawning a daemon thread to independently accept communication from the debug controller to update the shared memory to define breakpoints in the message flow.

7. A computer program product for providing debug information to a developer in a message flow environment, the message flow envronment comprising a debug controller and comprising defined message flows having nodes, the computer program product comprising:

a computer-readable data storage medium, means recorded on the medium for allocating shared memory accessible by all nodes in a defined message flow, means recorded on the medium for altering the definition of the message flow to provide nodes to function as debug nodes, means recorded on the medium for using the allocated shared memory to define specified nodes to be breakpoint nodes for the defined message flow, means recorded on the medium for, upon a message reaching a one of the nodes functioning as a debug node in the defined message flow, checking the shared memory to determine if the node is defined to be a breakpoint node, and means recorded on the medium for, if the node is defined as a breakpoint node, providing for the node to communicate debug information to the debug controller for display to the developer.

8. The computer program product of claim 7 in which the means recorded on the medium for altering the definition of the message flow comprises means for inserting debug node plugins in the message flow.

9. The computer program product of claim 7 further comprising means recorded on the medium for maintaining a runtime stack in a portion of the allocated shared memory, the means for maintaining the runtime stack comprising:

means for providing a unique identifier for each defined message flow, means for each node functioning as a debug node to carry out one of a set of stack operations on the runtime stack based on the message flow identifier of the defined message flow containing the node and a state of the stack, the set of stack operations comprising:

no action, where a top item on the stack is equal to the message flow identifier of the defined message flow containing the node, a push of the message flow identifier of the defined message flow containing the node, where the stack is empty, or the only items in a top two stack elements are not equal to the message flow identifier of the defined message flow containing the node, and a pop where a second item on the stack is equal to the message flow identifier of the defined message flow containing the node.

10. The computer program product of claim 9, in which means for the node communicating debug information to the debug controller further comprises means for the breakpoint node to communicate a current state of the runtime stack to the debug controller.

11. The computer program product of claim 7, further comprising:

means recorded on the medium for defining a pool of shared memory at an initialization stage in the message flow environment, and means recorded on the medium for providing each node functioning as a debug node in each defined message flow with a message flow identifier, means recorded on the medium for allocating shared memory accessible by all nodes in a defined message flow comprising means for a first debug node in a message to acquire a subset of the pool of shared memory and for associating that subset of memory with the message flow identifier, whereby other nodes with matching message flow identifiers access the said subset of memory.

12. The computer program product of claim 7, further comprising means recorded on the medium for spawning a daemon thread to independently accept communication from the debug controller to update the shared memory to define breakpoints in the message flow.

13. A computer program product for providing debug information to a developer in a message flow environment, the message flow environment comprising a debug controller and comprising defined message flows having nodes, the computer program product comprising:

a computer-readable data storage medium, means recorded on the medium for defining a pool of shared memory at an initialization stage in the message flow environment, means recorded on the medium for providing each node functioning as a debug node in each defined message flow with a message flow identifier, means recorded on the medium for allocating shared memory accessible by all nodes in a defined message flow comprising means for a first debug node in a message to acquire a subset of the pool of shared memory and for associating that subset of memory with the message flow identifier, whereby other nodes with matching message flow identifiers access the said subset of memory, means recorded on the medium for inserting debug nodes in the message flow, means recorded on the medium for using the allocated shared memory to define specified debug nodes to be breakpoint nodes for the defined message flow, means recorded on the medium for, upon a message reaching a debug node, checking the shared memory to determine if the debug node is defined to be a breakpoint node, and means recorded on the medium for, if the debug node is defined as a breakpoint node, providing for the debug node to communicate debug information to the debug controller for display to the developer.

14. A system for providing debug information to a developer in a message flow environment, the message flow environment, the system including memory, processor and network connection means, comprising a debug controller and comprising defined message flows having nodes, the system comprising:

means allocating shared memory accessible by all nodes in a defined message flow, means altering the definition of the message flow to provide nodes to function as debug nodes, means using the allocated shared memory to define specified nodes to be breakpoint nodes for the defined message flow, means responsive to a message reaching a one of the nodes functioning as a debug node in the defined message flow for checking the shared memory to determine if the node is defined to be a breakpoint node, and means responsive to the node being defined as a breakpoint node for providing the node to communicate debug information to the debug controller for display to the developer.

* * * * *